(12) United States Patent
Schlansker et al.

(10) Patent No.: US 9,137,179 B2
(45) Date of Patent: Sep. 15, 2015

(54) MEMORY-MAPPED BUFFERS FOR NETWORK INTERFACE CONTROLLERS

(75) Inventors: Michael Steven Schlansker, Palo Alto, CA (US); Erwin Oertli, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1829 days.

(21) Appl. No.: 11/493,285

(22) Filed: Jul. 26, 2006

(65) Prior Publication Data

US 2008/0028103 A1 Jan. 31, 2008

(51) Int. Cl.
*H04L 12/879* (2013.01)
*H04L 12/861* (2013.01)

(52) U.S. Cl.
CPC .............. *H04L 49/901* (2013.01); *H04L 49/90* (2013.01); *H04L 49/9063* (2013.01)

(58) Field of Classification Search
CPC ...................................................... H04L 49/901
USPC ............................................ 709/250; 710/22
See application file for complete search history.

(56) References Cited

U.S. PATENT DOCUMENTS

| | | | | |
|---|---|---|---|---|
| 5,515,538 A * | 5/1996 | Kleiman | ........................ | 710/260 |
| 5,659,798 A * | 8/1997 | Blumrich et al. | ................ | 710/26 |
| 5,764,896 A * | 6/1998 | Johnson | ......................... | 709/250 |
| 5,859,975 A * | 1/1999 | Brewer et al. | .................. | 709/213 |
| 5,887,134 A * | 3/1999 | Ebrahim | ......................... | 709/200 |
| 6,067,563 A * | 5/2000 | Thomas et al. | ................ | 709/212 |
| 6,067,608 A * | 5/2000 | Perry | ............................. | 711/203 |
| 6,070,219 A * | 5/2000 | McAlpine et al. | ............ | 710/263 |
| 6,185,438 B1 * | 2/2001 | Fox | ................................ | 455/560 |
| 6,745,286 B2 * | 6/2004 | Staub et al. | ..................... | 711/114 |
| 6,799,200 B1 | 9/2004 | Blackmore et al. | | |
| 7,133,940 B2 * | 11/2006 | Blightman et al. | ............. | 710/22 |
| 7,328,232 B1 * | 2/2008 | Osborn et al. | ................. | 709/201 |
| 2003/0007457 A1 * | 1/2003 | Farrell et al. | .................... | 370/235 |
| 2003/0158998 A1 * | 8/2003 | Smith | .......................... | 711/112 |
| 2004/0003135 A1 * | 1/2004 | Moore | .......................... | 709/321 |
| 2005/0132365 A1 * | 6/2005 | Madukkarumukumana et al. | ................................ | 718/1 |
| 2006/0034275 A1 * | 2/2006 | Roberts et al. | ................. | 370/389 |
| 2006/0174169 A1 * | 8/2006 | Inoue et al. | ..................... | 714/55 |
| 2008/0002578 A1 * | 1/2008 | Coffman et al. | .............. | 370/230 |

OTHER PUBLICATIONS

National Semiconductor Corporation, "DP8390D/NS32490D NIC Network Interface Controller", Jul. 1995.*
Blumrich et al., "Virtual Memory Mapped Network Interface for the SHRIMP Multicomputer", 1994 IEEE.*
Blumrich et al., "Virtuall Memory Mapped Network Interface for the SHRIMP Multicomputer", 1994.*
Athanasaki et al., "Hyperplane Grouping and Pipelined Schedules: How to Execute Tiled Loops Fast on Clusters of SMPs", 2005.*

(Continued)

*Primary Examiner* — O. C. Vostal
(74) *Attorney, Agent, or Firm* — Potomac Patent Group PLLC

(57) ABSTRACT

Systems and methods for providing network interface controllers (NICs) with memory-mapped buffers are described. A processing system includes a plurality of processing cells, each including at least one processor and at least one system memory. A NIC is associated with each of the processing cells for transmitting and receiving data between the processing cells. Each of the cells further includes a memory interconnect to which the NIC is directly connected and the NIC includes at least one memory-mapped buffer.

20 Claims, 6 Drawing Sheets

(56) References Cited

OTHER PUBLICATIONS

Athanasaki et al., "Pipelined Scheduling of Tiled Nested Loops onto Clusters of SMPs using Memory Mapped Network Interfaces", 2002.*

Hsiao et al., "MICA: A Memory and Interconnect Simulation Environment for Cache-Based Architectures", 1989.*

MTI, Xidian University; Xi'an, Xiaofeg et al; Research on Buffer Management Technology of NIC; 2001.

* cited by examiner

BACKGROUND

MEMORY-MAPPED BUFFERS FOR NETWORK INTERFACE CONTROLLERS

BACKGROUND

The present invention relates generally to data communication systems and methods and, more particularly, to data communication systems and methods in which memory-mapped receive and transmit buffers are provided to network interface controllers.

A network interface controller (NIC) is a hardware device that supports the transmission of data between computers as illustrated in FIG. 1. Therein, a symmetric multiprocessor (SMP) system 10 includes a number of central processor units (CPUs) 12 which share memory unit 14 via a memory interconnect 16. Although SMP 10 is shown as having four CPUs (cores), those skilled in the art will appreciate that SMP 10 can have more or fewer CPUs. SMP 10 sends messages to other SMPs 20, 30 and 40 under the control of NIC 18 via Ethernet connections and a fabric (switch) 22. The NIC 18 will typically have a processor (not shown) associated therewith, either as an integral part of the NIC or in the form of a helper processor, so that the NIC has sufficient intelligence to interpret various commands. The NIC 18, as well as various I/O devices 42, 44, are connected to the rest of the SMP via an I/O interconnect 46. The I/O interconnect 46 communicates with the memory interconnect 16 via an I/O adapter 48 (e.g., a bridge).

A common source and destination for transmitted data in such systems is paged virtual memory. Paged virtual memory provides for virtual addresses which are translated or mapped onto physical pages and enables virtual pages to be swapped out to disk or removed from main memory and later swapped in from disk to a new physical page location. An operating system can unilaterally perform page swaps of so-called "unpinned" virtual pages. Thus, application software operating on such systems typically accesses main memory using address translation hardware that ensures that the correct physical page is accessed, e.g., that the operating system has not initiated a page swap for the page that the application software needs to access. Software access pauses during time intervals when needed data is swapped out and resumes by accessing a new physical location when data is swapped in at that location.

Some networking solutions address the downtime associated with software suspension during virtual page swapping by providing for software to copy data from unpinned virtual memory to pinned interface memory. Pinned memory consists of pages that cannot be swapped to disk by the operating system. In such systems, the NIC 18 will typically access only pinned interface memory. This simplifies direct memory access (DMA) transfers performed by the NIC 18, since data is never swapped during a network operation which, in turn, guarantees that data remains accessible throughout a NIC's DMA data transfer and that the physical address of the data remains constant. However, such solutions require extra overhead in the form of data copying (e.g., copying from unpinned virtual memory to a pinned system buffer accessible by the NIC 18) that utilizes important system resources.

Another solution to the issue posed by unpinned virtual memory eliminates the above-described data copying but instead requires that the NIC 18 invoke an operating system function to pin a virtual page prior to transmitting data directly from or to that page. Additionally, the page must later be unpinned by a further NIC/operating system interaction in order to allow page swapping after network activity is finished. While this eliminates copies to pinned pages, the NIC 18 must now invoke expensive page pinning and page unpinning functions. Each of these operations requires communication between the NIC's processor and the operating system. When these communications require interrupts or polling of the I/O interconnect 46, they are very expensive in terms of resource utilization efficiency.

Accordingly, it would be desirable to provide mechanisms and methods which enable a NIC to more efficiently deal with data transfer issues.

SUMMARY

According to one exemplary embodiment of the present invention, a processing system includes a plurality of processing cells, each of the processing cells including at least one processor and at least one system memory, and a network interface controller (NIC) associated with each of the plurality of processing cells for transmitting and receiving data between the processing cells, wherein each of the plurality of cells further includes a memory interconnect to which the NIC is directly connected and said NIC includes at least one memory-mapped buffer.

According to another exemplary embodiment of the present invention, a method for communicating data in a processing system includes the steps of providing a plurality of processing cells, each of the processing cells including at least one processor and at least one system memory, and transmitting and receiving data between the processing cells via a network interface controller (NIC) associated with each of the plurality of processing cells, wherein each of the plurality of cells further includes a memory interconnect to which the NIC is directly connected and the NIC includes at least one memory-mapped buffer.

BRIEF DESCRIPTION OF THE DRAWINGS

The accompanying drawings, which are incorporated in and constitute a part of the specification, illustrate an embodiment of the invention and, together with the description, explain the invention. In the drawings.

DETAILED DESCRIPTION

The following description of the exemplary embodiments of the present invention refers to the accompanying drawings. The same reference numbers in different drawings identify the same or similar elements. The following detailed description does not limit the invention. Instead, the scope of the invention is defined by the appended claims.

Figure 1:
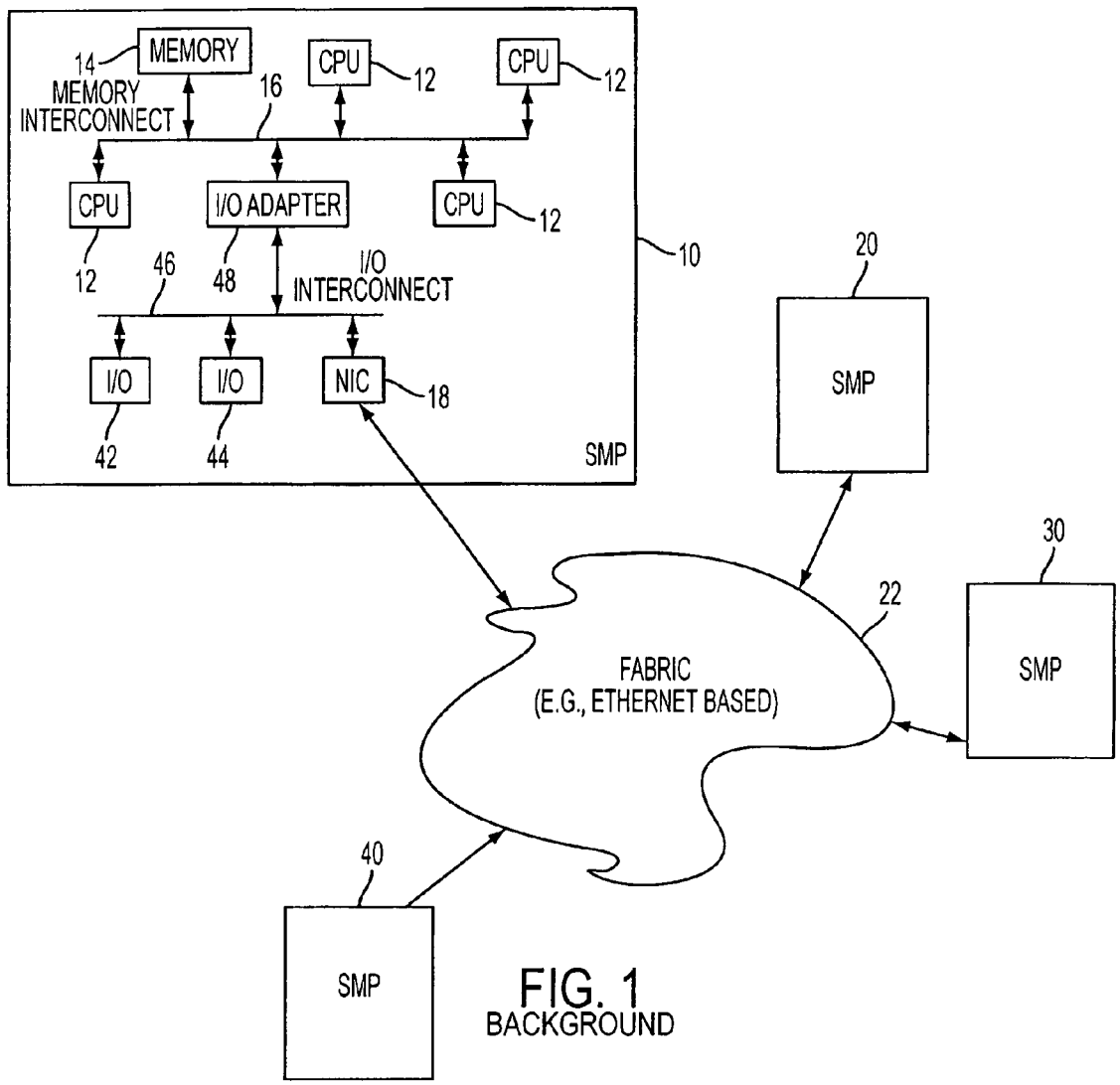
FIG. 1 illustrates an exemplary processing system in which a network interface controller is connected to the processing system via an I/O interconnect.

According to exemplary embodiments of the present invention, transmit and receive command and data buffers within the NIC are mapped directly onto the processors' memory interconnect (also sometimes referred to as a "memory bus", "coherent interconnect" or "front-side bus"). This allows, among other things, for: efficient copying of data to the NIC; efficient copying of commands to the NIC; efficient copying of data from the NIC, and efficient detection of data arrival and of command completion. To implement such memory-mapped buffers, the overall architecture of an SMP is modified such that the NIC is connected directly to the memory interconnect (rather than indirectly via an I/O interconnect 46 and I/O adapter 48 as shown in FIG. 1). A general architecture which supports such memory-mapped transmit and receive buffers according to an exemplary embodiment will now be described with respect to FIG. 2.

Figure 2:
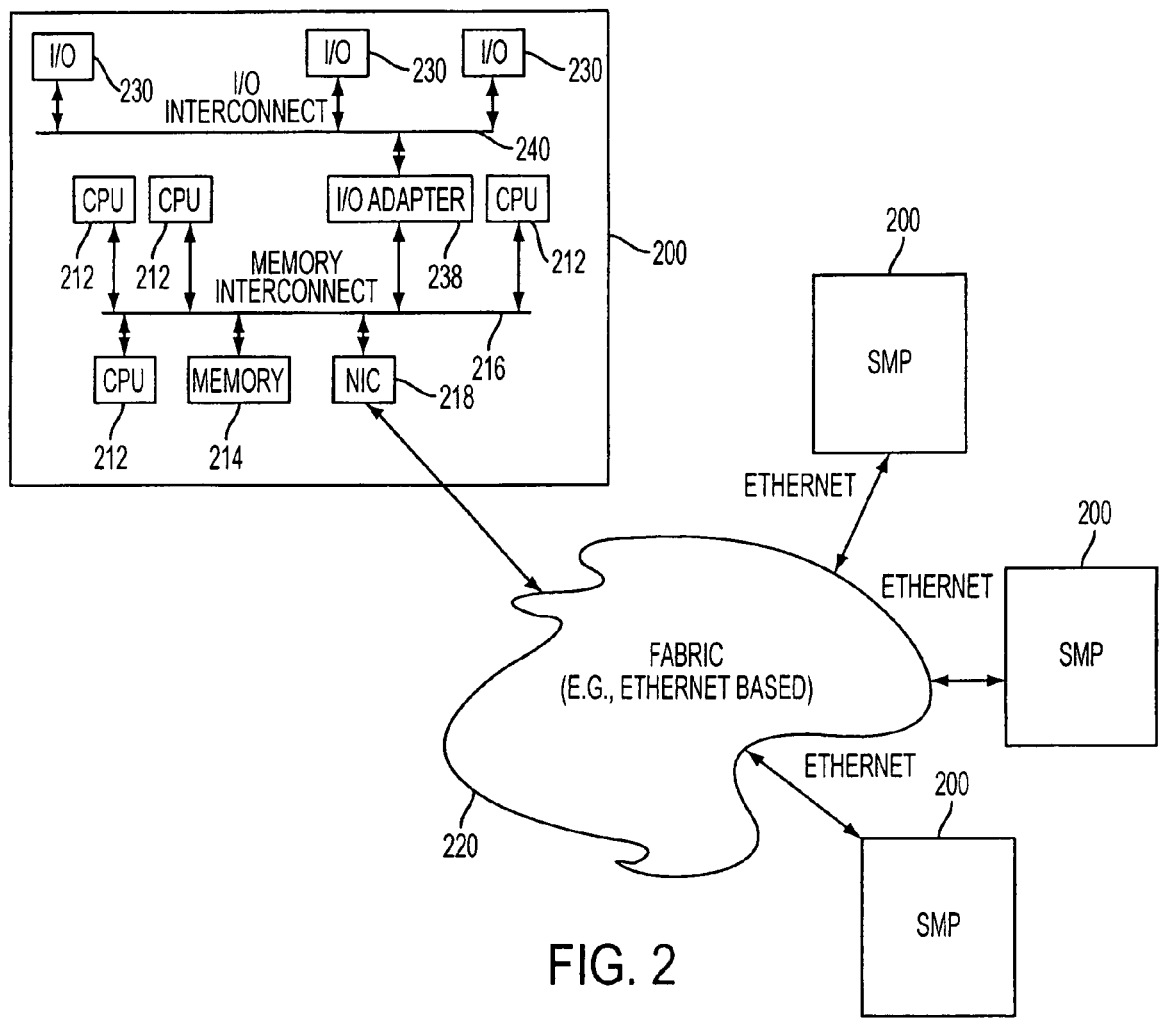
FIG. 2 illustrates an exemplary processing system in which a NIC controller is connected to the processing system via a direct connection to a memory interconnect according to an exemplary embodiment.

Therein, an SMP system 200 includes a number of central processor units (CPUs) 212 which share memory unit 214 via a memory interconnect 216. Although SMP 200 is shown as having four CPUs (cores), those skilled in the art will appreciate that SMP 200 can have more or fewer CPUs. SMP 200 sends messages to other SMPs 200 under the control of NIC 218 via Ethernet connections and a fabric (switch) 220. The NIC 218 will typically have a processor (not shown) associated therewith, either as an integral part of the NIC or in the form of a helper processor, so that the NIC has sufficient intelligence to interpret various commands. Various I/O devices 230, e.g., displays, second memory storage devices, etc., are connected to the memory interconnect 216 via an I/O adapter 238 (e.g., a bridge) and an I/O interconnect 240. As can be seen from a comparison of FIGS. 1 and 2, the exemplary embodiment of FIG. 2 provides for the NIC 218 to be directly connected to the memory interconnect 216 rather than indirectly via an I/O interconnect and I/O adapter. Among other things, this architecture facilitates memory-mapping of transmit and/or receive buffers within the NIC 218. As used herein, the term "memory-mapping" refers to the ability of the CPUs 212 to write (or read) directly to (or from) the transmit (or receive) buffers within the NIC 218 via reserved memory locations within memory 214 that correspond to the buffers.

Thus, the receive side of the exemplary system of FIG. 2 (a portion of which is illustrated as FIG. 3) will include one or more memory-mapped receive buffers 300. As shown therein, the NIC 218 is directly connected to the memory interconnect 216 since data does not have to pass through an I/O bus on its way between the NIC 218, on the one hand, and system memory 308 or processor 304 on the other hand. As used herein, the phrase "directly connected" does not exclude the provision of interfaces, e.g., memory interface circuitry 305, between a buffer and the memory interconnect.

Figure 3:
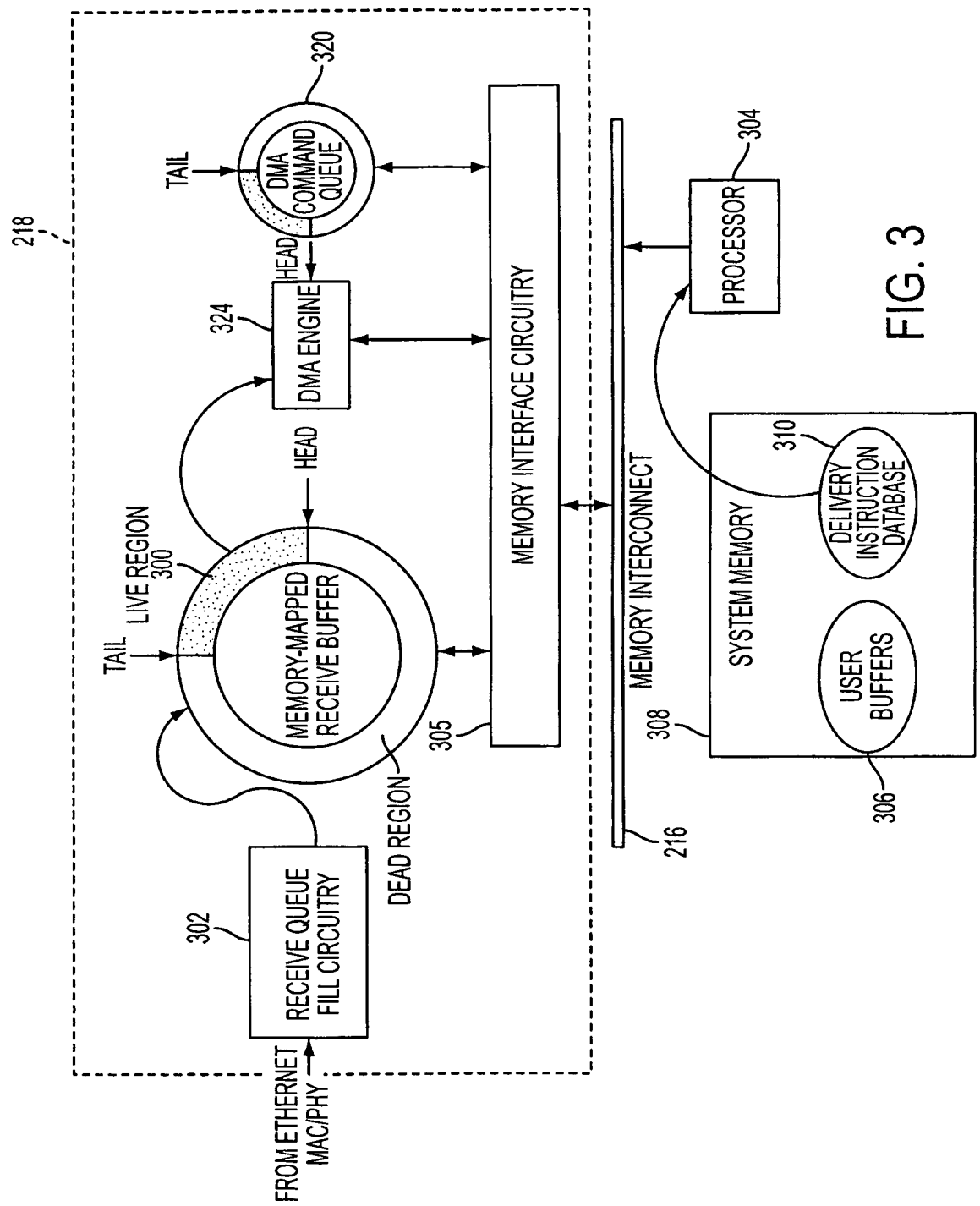
FIG. 3 depicts a portion of a NIC according to an exemplary embodiment of the present invention including a memory-mapped receive buffer.

On the left hand side of FIG. 3, data arrives through, e.g., an Ethernet interface, and is placed into the memory-mapped receive buffer 300 by receive queue fill circuitry 302. According to this exemplary embodiment, the memory-mapped receive buffer 300 is a circular queue data structure, although the present invention is not limited to circular queues. In this example, however, the receive buffer 300 has contents stored therein (in the "live region") which are identified by tail and head tail pointers that indicate most recently deposited data and least recently deposited data, respectively. As it is received, data is inserted at the tail of the receive buffer 300 and the tail pointer is moved across newly inserted data. Data is removed from the live region of the receive buffer 300 by moving the head pointer across unneeded data.

When the receive buffer 300 is full, incoming packets can be dropped to order to prevent buffer overflow. When a reliable protocol (such as Transmission Control Protocol or TCP) is used to retransmit packets, correct operation is maintained even though packets are dropped. Other techniques can be used to prevent buffer overflow. For example, instead of dropping a most recently received frame, the system could drop a frame which was received earlier, e.g., an oldest received frame. The receive queue fill circuitry 302 deposits data from an arriving Ethernet frame into a region of the receive buffer 300 beyond the tail pointer. The tail pointer is advanced across valid data from the Ethernet frame. The advancement of the tail pointer across arriving data indicates that new data has arrived and may be processed. The receive buffer head and tail pointers are also memory-mapped, i.e., the values associated with the receive buffer 300's head pointer and tail pointer are automatically updated (via memory interface circuitry 305) at predetermined memory locations within the user buffer area 306 of system memory 308. This enables the head and tail pointer values to be directly accessed by processor 304, which can make memory references using the memory interconnect 216. This, in turn, enables processor 304 to read, for example, the receive buffer tail pointer and compare its current value to a previous receive buffer tail pointer value. When the value changes, the processor 304 knows that new Ethernet frame data has arrived.

This latter feature illustrates the capability of processing systems and methods according to exemplary embodiments of the present invention to implement efficient polling of the NIC 218 using cache coherent, memory interconnect access. As long as the data within the receive buffer 300 remains unchanged, the processor 304 may read a cached value of that data that is held within the processor. This could occur, for example, during periods of time when no message arrives into the NIC 218. When a new message arrives from the network, data is delivered into the receive buffer 300 and the receive queue fill circuitry causes data within the receive buffer 300 to change value. When values within the receive buffer 300 change, and that data is read by the processor 304, the data is transferred to the processor 304 based on cache coherent shared memory protocols operating in the system, and the processor 304 then observes the changed value in its cache memory (not shown in FIG. 3). This causes the processor 304 to detect a newly arriving message. Note that this polling technique does not require the transfer of information from the receive buffer 300 to the polling processor until a message is received.

In addition to enabling efficient polling, exemplary embodiments of the present invention provide for efficient data transport to its post-receive location. Data is transported from Ethernet frames residing within the receive buffer 300 to one or more application buffers (not shown) within one or more user applications. Higher-level software protocols may specify data delivery instructions which are stored in a delivery instruction database 310 in system memory 308. These delivery instructions may be selectively retrieved from the database 310 for use in handling received data based upon header information that is embedded in the Ethernet frame. Applications may have complex data delivery requirements that allow arriving data to be matched against tag information (or other information) to determine the proper location for the data after it is received in the receive buffer 300. For example Message Passing Interface (MPI) techniques provide for tag and rank information to be matched to determine into which read buffer an arriving message is to be placed. In another example, header data may indicate a specific TCP socket to which data should be delivered. Low-level receive buffer processing software may then deliver data with a single copy from the receive buffer 300 to the proper target location. Note that although this exemplary embodiment describes receive operations in the context of a single receive buffer 300, plural receive buffers can also be implemented in a similar manner to support, e.g., scatter operation.

Another example of data delivery instructions that can be stored in delivery instruction database 310 are those which support remote direct memory access (RDMA). An RDMA delivery instruction describes a buffer region (not shown) into which data can be directly placed, e.g., a list of physical pages that contain data that is contiguous in virtual memory. An incoming Ethernet packet can carry the name of the RDMA delivery instruction, a buffer offset, a length, and actual data. Using the referenced RDMA delivery instruction, the data is delivered into the buffer region starting at the desired offset. This RDMA delivery instruction can be reused until all data has been successfully placed in the buffer. At this time, the instruction may be removed from the RDMA delivery database. A higher-layer protocol can be used to install/remove RDMA delivery instructions to/from the delivery instruction database 310 and a lower-layer protocol then uses these delivery instructions to directly deliver data.

Thus, when an incoming Ethernet frame is processed, the processor 304 can use information obtained from the Ethernet packet as well as information obtained from the delivery database 310 in order to determine a target address location. DMA commands are then inserted at the tail of the DMA command buffer 320 in order to initiate appropriate DMA transfers via DMA engine 324. As DMA commands are completed the DMA command head pointer moves across the command to signal command completion. When a DMA command is known to be complete, data within the receive buffer 300 that has been copied to the final user buffer location is no longer needed. The receive buffer's head pointer may then be moved across such data without data loss.

Transmit-side operations in the NIC 218 can be performed in much the same way as the receive-side operations discussed above. A memory-mapped transmit buffer (not shown), or multiple memory-mapped transmit buffers, can be provided to the NIC 218, which has a corresponding memory space allocated within the user buffers area 306 of system memory 308. The processor 304 can readily monitor transmit activities by, for example, comparing its cached transmit values (e.g., head pointer and tail pointer) against corresponding values in the system memory 308. Exemplary embodiments of the present invention which implement NICs having memory-mapped transmit and receive buffers provide a number of benefits, some of which are mentioned above. In addition to processors, such as processor 304, having direct access to buffer data, program threads (typically a kernel thread), running on the host operating system, can directly communicate with the NIC 218 through memory-mapped command and data buffers for transmission and reception.

For example, a program thread running within the host operating system can efficiently initiate transmit-side or receive-side DMA and detect the completion of pending transmit-side or receive-side DMA operations. DMA is initiated by writing to the memory-mapped command buffer 320 (which also has a corresponding memory space allocated within the users buffer portion 306) and DMA completion is detected by reading from the memory-mapped command buffer 320. Polling for command completion is efficient because the status of a DMA completion can be cached for repeated reading within processor 304 and no transfer of command status from NIC 218 to processor 304 is required until the DMA's completion status changes value. Whenever the value of data that represents the DMA's completion status changes, the corresponding data within the processor's cache (not shown) can be invalidated. Any subsequent read of DMA completion status causes new valid data to be transferred from the NIC 218 to the processor 304. Thus a program thread running on the host operating system can efficiently initiate a DMA transfer and detect the completion of that DMA transfer.

Figure 4:
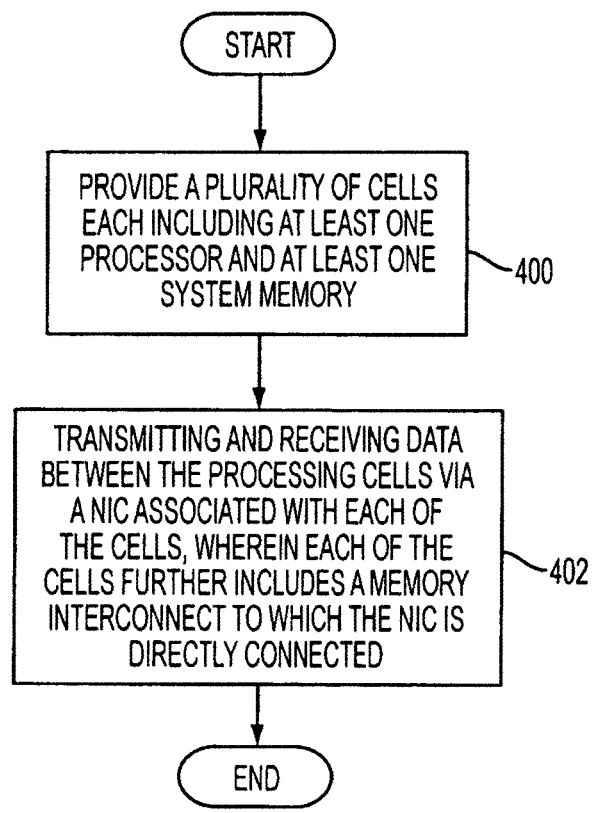
FIG. 4 is a flow chart depicting a general method for communicating data according to an exemplary embodiment of the present invention.

Thus, according to one, general exemplary embodiment of the present invention, a method for communicating data in a processing system includes the steps illustrated in the flowchart of FIG. 4. Therein, at step 400, a plurality of processing cells, each of which include at least one processor and at least one system memory are provided. Data is transmitted and received between the processing cells via a NIC associated with each of said plurality of processing cells at step 410, wherein each of the plurality of cells further includes a memory interconnect to which the NIC is directly connected and the NIC includes at least one memory-mapped buffer.

As mentioned above in the Background section, page pinning associated with NIC data transfer is also an interesting issue for SMP system designers (as well as designers of other processing systems). Exemplary embodiments of the present invention also facilitate page pinning by providing memory-mapped receive and transmit buffers which allow kernel programs running within a host operating system to efficiently control page pinning for DMA-based copying for the purposes of network transmission or network reception. In one exemplary embodiment, one or more kernel program threads running on the host operating system can regulate the flow of large amounts of data through both the transmission and reception process. This allows efficient pinning and unpinning of needed pages while not requiring that too many pages are pinned as described below with respect to the flowcharts of FIGS. 5 and 6.

Figure 5:
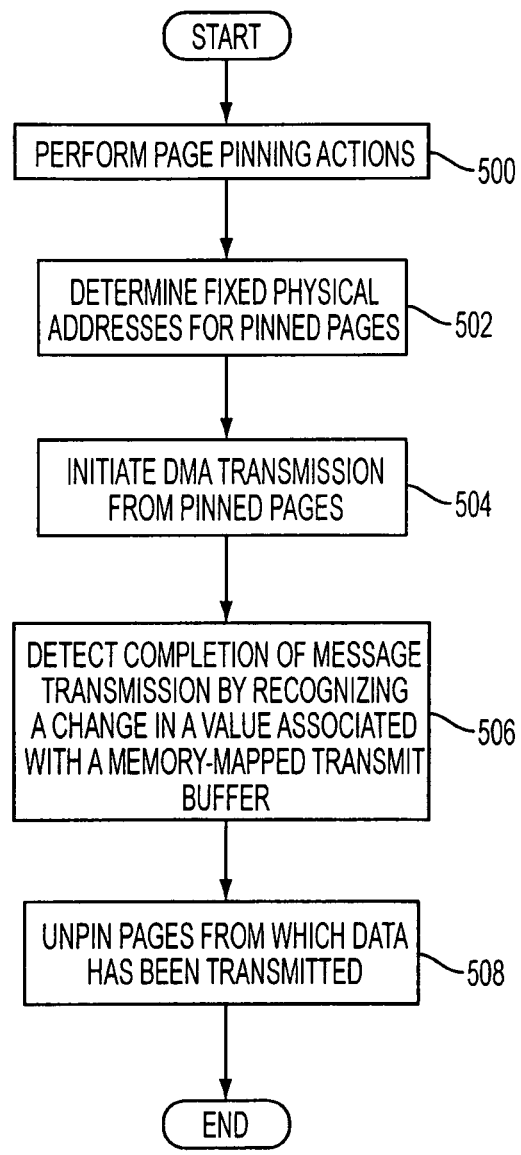
FIG. 5 is a flow chart depicting a method for managing memory according to an exemplary embodiment of the present invention.

For transmission, in FIG. 5, a thread performs page pinning actions needed for transmission at step 500 (e.g., informs the operating system that certain pages are not to be swapped until further notice), determines the fixed physical addresses for the pinned pages (step 502), and then initiates DMA to transmit data from the pinned pages (step 504). When a thread detects the completion of message transmission at step 506 (e.g., by recognizing a change in a value associated with the memory-mapped transmit buffer, such as a change in a head pointer value), the thread can then unpin pages that have already been transmitted at step 508. The process illustrated in FIG. 5 can be repeated as necessary (either sequentially or in parallel, e.g., in a pipelined manner) such that, as DMA transmission progress is detected, new pages can be pinned as needed without unnecessarily pinning too many pages.

Figure 6:
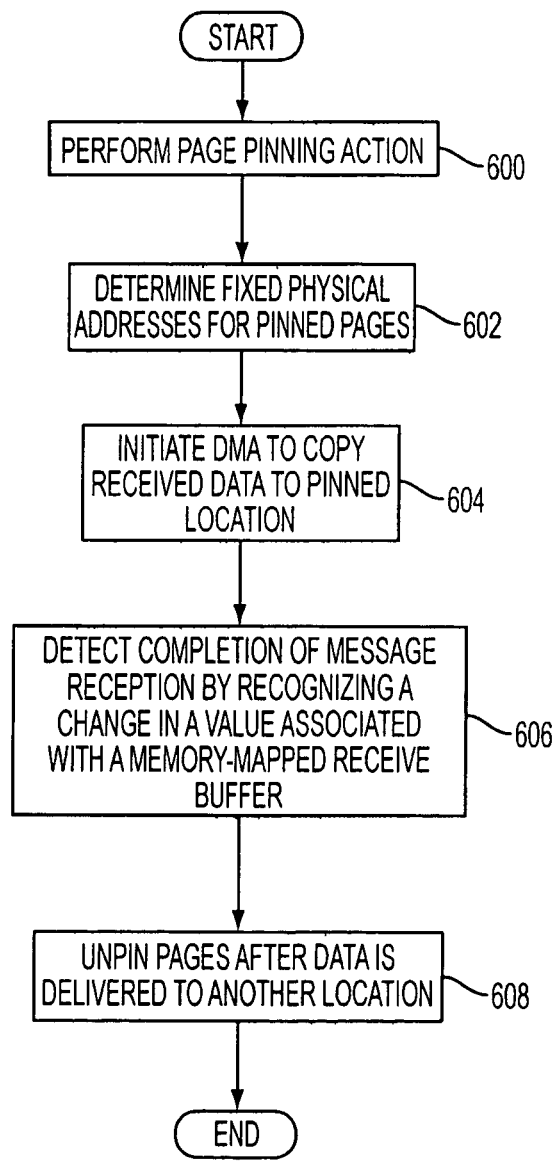
FIG. 6 is a flow chart depicting a method for managing memory according to another exemplary embodiment of the present invention.

For reception, in FIG. 6, a thread performs page pinning actions needed for reception at step 600, determines the fixed physical address of the pinned pages (step 602), then initiates DMA to copy received data to a pinned location (step 604). When a thread detects the completion of message reception at step 606, (e.g., by detecting a change in a value associated with the memory-mapped receive buffer, such as a change in tail pointer value), the thread can then unpin pages after the data copied thereto has subsequently been delivered to, e.g., an application buffer, based on delivery instructions as described above, at step 608. The process illustrated in FIG. 6 can be repeated (either sequentially or in parallel, e.g., in a pipelined manner), such that as DMA reception progress is detected, new pages can be pinned as needed without unnecessarily pinning too many pages.

Transmit-side and receive-side progress can be coordinated using protocols that send messages through the network of FIG. 2. For example, a receiving NIC 218 can pin pages associated with its receive-side buffer 300. The receiving NIC 218 can then inform a transmitter, e.g., another NIC 218 in a different SMP 200, by sending a message, that it is ready to receive a block of information into that receive-side buffer 300. The transmitter can then pin pages associated with the corresponding transmit-side buffer. Data can then be transmitted using DMA to copy information from the transmitting user's buffer to the network. Received data can be copied, using DMA, from the NIC's receive buffer 300 to the receiving user's buffer within user buffers region 306. After copying is complete, the receiving NIC can unpin the pages associated with the receiving buffer 300 and send a message to the transmitting NIC indicating that reception is complete and that the transmit-side buffer can also be unpinned. This cycle of page pinning for receiver and transmitter, DMA-based transmission and DMA-based reception, detection of DMA completion and page unpinning for receiver and transmitter can all be performed without interrupts or system calls, since the NICs are directly connected to their respective memory interconnects. This cycle can be repeated in order to move large amounts of data through a network without unnecessarily pinning too much memory or without incurring expensive overheads for handling system calls or interrupts.

Systems and methods according to these exemplary embodiments can also be used to perform other functions. For example, among other things, the receiver buffer 300 may be used to implement out of order delivery. For example, the processing of a first Ethernet frame for which delivery instructions are not yet available may be deferred. A second Ethernet frame, received subsequently by the NIC 218 relative to the first Ethernet frame, may be processed and delivered while the processing of the first frame is deferred. Meanwhile, delivery instructions can be inserted into the delivery instruction database 310 for the first Ethernet frame by a higher level application. Receive processing can then deliver that first Ethernet frame according to provided instructions.

Thus, according to exemplary embodiments, a kernel-mode helper thread can both access SMP operating system data structures as well as communicate directly with a NIC that is on the front-side bus. The use of a kernel-mode thread enables processing systems and methods in accordance with these exemplary embodiments to perform the entire pin, transmit/receive data, unpin cycle without wasting bus cycles during polling and without using expensive interrupts on, e.g., an I/O bus.

The foregoing description of exemplary embodiments of the present invention provides illustration and description, but it is not intended to be exhaustive or to limit the invention to the precise form disclosed. Modifications and variations are possible in light of the above teachings or may be acquired from practice of the invention. The following claims and their equivalents define the scope of the invention.

The invention claimed is:

1. A processing system comprising:
a plurality of processing cells, each of said processing cells including at least one processor and at least one system memory; and
a network interface controller (NIC) associated with each of said plurality of processing cells for transmitting and receiving data between said processing cells;
wherein each of said plurality of cells further includes a memory interconnect to which said NIC is directly connected and said NIC includes at least one memory-mapped buffer that is directly read and write accessible from a processing cell associated with said NIC.

2. The system of claim 1 wherein said NIC further comprises:
wherein said at least one memory-mapped buffer is one of a memory-mapped transmit buffer and a memory-mapped receive buffer, wherein a portion of said at least one system memory is allocated for memory-mapping said at least one of a memory-mapped transmit buffer and a memory-mapped receive buffer.

3. The system of claim 2, wherein said at least one of said memory-mapped transmit buffer and said memory-mapped receive buffer is a circular queue having a head pointer and a tail pointer and further wherein current values of said head pointer and said tail pointer are mapped to predetermined locations within said system memory.

4. The system of claim 3, wherein said at least one of a memory-mapped transmit buffer and a memory-mapped receive buffer is a memory mapped receive buffer and further wherein said at least one processor compares a previously stored value of one of said head pointer and said tail pointer with a respective current value of said one of said head pointer and said tail pointer as a polling mechanism for said memory-mapped receive buffer.

5. The system of claim 3, wherein said at least one processor compares a previously stored value of at least one of said head pointer and said tail pointer with a respective current value of said at least one of said head pointer and said tail pointer to determine whether to unpin one or more pages in said system memory.

6. The system of claim 1, further comprising:
an I/O interconnect through which I/O devices communicate with said at least one processor and at least one system memory; and
an I/O adapter for connecting said I/O interconnect to said memory interconnect.

7. The system of claim 1, wherein said system memory further comprises a delivery instruction database and wherein said at least one of a memory-mapped transmit buffer and a memory-mapped receive buffer is a memory-mapped receive buffer, such that said at least one processor operates to forward data received in said memory-mapped receive buffer in accordance with an instruction from said delivery instruction database.

8. The system of claim 7, wherein said processor performs a direct memory access (DMA) transfer of said data in accordance with said instruction from said delivery instruction database.

9. The system of claim 6, further comprising:
an operating system application running on said at least one processor;
a kernel-mode helper thread operating under said operating system which can access operating system data structures and communicate directly with a said NIC,
wherein said kernel-mode helper thread performs a pin, transmit/receive data, unpin cycle without interrupting said I/O interconnect.

10. A method for communicating data in a processing system comprising the steps of:
providing a plurality of processing cells, each of said processing cells including at least one processor and at least one system memory; and
transmitting and receiving data between said processing cells via a network interface controller (NIC) associated with each of said plurality of processing cells;
wherein each of said plurality of cells further includes a memory interconnect to which said NIC is directly connected and said NIC includes at least one memory-mapped buffer that is directly read and write accessible from a processing cell associated with said NIC.

11. The method of claim 10 further comprising the step of:
allocating a portion of said at least one system memory for memory-mapping said at least one memory-mapped buffer.

12. The method of claim 11, wherein said at least one memory-mapped buffer is a circular queue having a head pointer and a tail pointer and further comprising the step of:
mapping current values of said head pointer and said tail pointer to predetermined locations within said system memory.

13. The method of claim 12, wherein said at least one memory-mapped buffer is a memory mapped receive buffer and further comprising the step of:
comparing, by said at least one processor, a previously stored value of one of said head pointer and said tail pointer with a respective current value of said one of said head pointer and said tail pointer as a polling mechanism for said memory-mapped receive buffer.

14. The method of claim 12, further comprising the step of:
comparing, by said at least one processor, a previously stored value of at least one of said head pointer and said tail pointer with a respective current value of said at least one of said head pointer and said tail pointer to determine whether to unpin one or more pages in said system memory.

15. The method of claim 10, further comprising the step of:
connecting I/O devices with said at least one processor and said at least one system memory via an I/O interconnect; and
connecting said I/O interconnect to said memory interconnect via an I/O adapter.

16. The method of claim 10, wherein said system memory further comprises a delivery instruction database and wherein said at least one memory-mapped buffer is a memory-mapped receive buffer, said method further comprising the step of:
forwarding, by said at least one processor, data received in said memory-mapped receive buffer in accordance with an instruction from said delivery instruction database.

17. The method of claim 16, further comprising the step of:
performing a direct memory access (DMA) transfer of said data in accordance with said instruction from said delivery instruction database.

18. The method of claim 16, further comprising the steps of:
running an operating system application on said at least one processor;
operating a kernel-mode helper thread under said operating system which can access operating system data structures and communicate directly with a said NIC; and
performing, by said kernel-mode helper thread, a pin, transmit/receive data, unpin cycle without interrupting said I/O interconnect.

19. The method of claim 10 further comprising the steps of:
performing page pinning actions associated with data transmission in said NIC;
determining fixed, physical addresses for pinned pages;
initiating a direct memory access (DMA) transfer from said pinned pages;
detecting completion of said data transmission by recognizing a change in a value associated with a memory-mapped transmit buffer; and
unpinning pages from which data has been transmitted.

20. The method of claim 10 further comprising the steps of:
performing page pinning actions associated with data reception in said NIC;
determining fixed, physical addresses for pinned pages;
initiating a direct memory access (DMA) to copy received data to said pinned pages;
detecting completion of said data reception by recognizing a change in a value associated with a memory-mapped receive buffer; and
unpinning pages after data has been delivered from said pinned pages to another location.

* * * * *